United States Patent
Baughman et al.

(10) Patent No.: US 9,710,451 B2
(45) Date of Patent: Jul. 18, 2017

(54) NATURAL-LANGUAGE PROCESSING BASED ON DNA COMPUTING

(71) Applicant: International Business Machines Corporation, Armonk, NY (US)

(72) Inventors: Aaron K. Baughman, Silver Spring, MD (US); Peter K. Malkin, Yorktown Heights, NY (US); Brian M. O'Connell, Cary, NC (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 14/318,852

(22) Filed: Jun. 30, 2014

(65) Prior Publication Data

US 2015/0379399 A1    Dec. 31, 2015

(51) Int. Cl.
*G06F 17/27* (2006.01)

(52) U.S. Cl.
CPC .......... *G06F 17/274* (2013.01); *G06F 17/271* (2013.01)

(58) Field of Classification Search
None
See application file for complete search history.

(56) References Cited

U.S. PATENT DOCUMENTS

| | | | |
|---|---|---|---|
| 6,876,930 B2 | 4/2005 | Murray et al. | |
| 6,950,753 B1 | 9/2005 | Rzhetsky et al. | |
| 7,974,788 B2 | 7/2011 | Rzhetsky et al. | |
| 2002/0168664 A1 | 11/2002 | Murray et al. | |
| 2003/0022164 A1* | 1/2003 | Mills, Jr. ................ | B82Y 10/00 435/6.13 |
| 2003/0224356 A1* | 12/2003 | Knoll ................... | C12Q 1/6876 435/6.11 |
| 2004/0143725 A1* | 7/2004 | Addison ................ | G06N 3/002 712/28 |

(Continued)

OTHER PUBLICATIONS

Bel-Enguix et al, "A BioInspired Model for Parsing of Natural Languages", Studies in Computational Intelligence (SCI) 129, 369-378 (2008), Springer-Verlag Berlin Heidelberg 2008.*

(Continued)

*Primary Examiner* — Stanley K Hill
*Assistant Examiner* — Ilya Traktovenko
(74) *Attorney, Agent, or Firm* — Schmeiser, Olsen & Watts, LLP; Michael A. Petrocelli (57) ABSTRACT

A method and associated systems for using methods of DNA computing to implement an operation of a natural-language processing (NLP) system. A processor translates components of a slot grammar of the NLP system and an input filler vocabulary into listings of sequences of nucleotides. These sequences are encoded into a set of nucleotide chains, which are then allowed to chemically interact with each other such that the chains automatically bond in ways that are analogous to the way that a traditional computerized NLP system would use inferences and contextual information to fill slots of the slot grammar with tokens of the filler vocabulary. The resulting DNA molecules are extracted and information encoded into sequences of nucleotides comprised by the extracted molecules is decoded to yield a set of all possible strings that may generated by filling slots of the slot grammar with tokens of the vocabulary.

17 Claims, 2 Drawing Sheets

(56) References Cited

U.S. PATENT DOCUMENTS

| | | | | |
|---|---|---|---|---|
| 2005/0064449 | A1* | 3/2005 | Knoll | C12Q 1/6876 435/6.11 |
| 2007/0094166 | A1* | 4/2007 | Addison | B82Y 10/00 706/13 |
| 2007/0161081 | A1* | 7/2007 | Jin | C07K 14/4753 435/69.1 |
| 2007/0166788 | A1* | 7/2007 | Jin | C07K 14/705 435/69.1 |
| 2007/0277161 | A1* | 11/2007 | Herbordt | G06F 8/447 717/140 |
| 2008/0077570 | A1* | 3/2008 | Tang | G06F 17/30684 |
| 2009/0170769 | A1* | 7/2009 | Jin | C07K 14/71 514/1.1 |
| 2010/0003684 | A1* | 1/2010 | Knoll | C12Q 1/6876 435/6.11 |
| 2010/0146336 | A1* | 6/2010 | Baughman | G06Q 10/06 714/26 |
| 2011/0314006 | A1* | 12/2011 | Sweeney | G06F 17/2785 707/723 |
| 2012/0021486 | A1* | 1/2012 | Dinu | A01N 59/00 435/188 |
| 2012/0121591 | A1* | 5/2012 | Sullivan | A61K 39/39591 424/134.1 |
| 2012/0156676 | A1* | 6/2012 | Weidhaas | C12Q 1/6886 435/6.11 |
| 2014/0278359 | A1* | 9/2014 | Speer | G06F 17/2785 704/9 |

OTHER PUBLICATIONS

Ferretti et al, "Remarks on Relativisations and DNA Encodings", Molecular Computing (Head Festschrift), LNCS 2950, pp. 132-138, 2004, Springer-Verlag Berlin Heidelberg 2004.*

List of IBM Patents or Patent Applications Treated as Related; attached Oct. 27, 2015; 1 page.

Keum-Young Sung et al., Recognition and Modeling of RNA Pseudoknots Using Context-Sensitive Pattern Matching, 2006 International Conference on Hybrid Information Technology (ICHIT'06), 0-7695-2674-8/06, IEEE, 6 pages.

Potrus et al., Normalization and Rectification Method for online Hindi Digit Recognition with Partial Alignment Algorithm, 2010 International Conference on Electronics and Information Engineering (ICEIE 2010), 978-1-4244-7681-7, copyright, 2010 IEEE, vol. 1, VI-223-227.

Qing-Sheng et al., A DNA-based Encoding and Retrieving Method for Jiaguwen, 978-1-4244-5540-9/10, copyright, 2010 IEEE, pp. 51-55.

Daugherty et al., Virtual Human versus Human Administration of Photographic Lineups, VR Software and Technology, 0272-1716/08, copyright, 2008 IEEE, IEEE Computer Graphics and Applications, pp. 65-75.

Csuhaj-Varju, et al., Networks of Language Processors: a language theoretic framework for mainly locally connected processor arrays, 1998 Fifth IEEE International Workshop on Cellular Neural Networks and their Applications, London, England, 14-17, Apr. 1998, 0-7803-4867-2/98, copyright 1998, IEEE, pp. 137-142.

Pavlov, Dmitry, Sequence Modeling with Mixtures of Conditional Maximum Entropy Distributions, Proceedings of the Third IEEE International Conference on Data Mining (ICDM'03), 0-7695-1978-4/03, copyright, 2003 IEEE, 8 pages.

Cohen et al., Exploring dangerous neighborhoods: Latent Semantic Analysis and computing beyond the bounds of the familiar, Retrieved from internet on Mar. 24, 2014, http://www.ncbi.nlm.nih.gov/pmc/articles/PMC1560563/, 8 pages.

Jensen et al., A method for computing lexical semantic distance using linear functionals, from websemanticsjournal.org, 2008, 10 pages.

Mira et al., Methods and Models in Artificial and Natural Computation, A Homage to Professor Mira's Scientific Legacy, Third International Work-Conference on the Interplay Between Natural and Artificial Computation, IWINAC 2009, Santiago de Compostela, Spain, Jun. 22-26, 2009, Proceedings, Part 1, 3 pages.

Heindel et al., ARPL—A Retrieval Process Language, Original Publication Date: Aug. 14, 1972, IP.com No. IPCOM000128816D, 14 pages.

Thomas et al., Challenges in the association of human single nucleotide polymorphism mentions with unique database identifiers, BioMed Central, BMC Bioinformatics 2011, 12(Suppl 4):S4, http://www.biomedcentral.com/1471-2105/12/S4/S4, 18 pages.

Francez, Nissim, Extended Naming Conventions for Communicating Processes, Original Publication Date: Dec. 30, 1899, IP.com No. IPCOM000148488D, 22 pages.

* cited by examiner

NATURAL-LANGUAGE PROCESSING BASED ON DNA COMPUTING

TECHNICAL FIELD

The present invention relates to DNA computing.

SEQUENCE LISTING

The following application includes a Sequence Listing provided herein as required under 37 C.F.R. §1.821, submitted in compliance with 37 C.F.R. §1.52(e). The Sequence Listing is hereby incorporated by reference into this disclosure in compliance with the requirements under 37 C.F.R. 1.52(e)(5).

BACKGROUND

A DNA computer may use known properties of DNA molecules to solve a computing problem identified by information encoded into two or more chains of nucleotides. After allowing these chains to chemically bond into one or more DNA molecules, a solution to the computing problem may be identified by decoding information represented by the chemical structure of the DNA molecules.

Natural-language processing (NLP) is a field of computer science that may allow a processor to infer meaning from a natural-language interaction with a user. A set of natural-language grammatical rules represented by data stored in a knowledgebase may identify ways in which the processor may use methods of NLP to infer context and meaning from a freeform combinations of words comprised by a vocabulary.

BRIEF SUMMARY

A first embodiment of the present invention provides a method for natural-language processing based on DNA computing, the method comprising:

a processor of a computer system translating a grammatical rule of a natural language into a listing of a first sequence of nucleotides, wherein the grammatical rule comprises an ordered set of slots, and wherein each slot of the ordered set of slots may be filled with a compatible token, and wherein a token is a string of characters comprised by a vocabulary of the natural language;

the processor further translating a first token of the vocabulary into a listing of a second sequence of nucleotides;

the processor decoding information represented by a bonded pair of nucleotide sequences, wherein the bonded pair was formed by a chemical bonding of a first nucleotide chain to a second nucleotide chain, wherein nucleotides of the first nucleotide chain are ordered in the first sequence, wherein nucleotides of the second nucleotide chain are ordered in the second sequence, and wherein the decoded information represents a data structure formed by filling a first slot of the ordered set of slots with the first token A second embodiment of the present invention provides a computer program product, comprising a computer-readable hardware storage device having a computer-readable program code stored therein, said program code configured to be executed by a processor of a computer system to implement a method for natural-language processing based on DNA computing, the method comprising:

the processor translating a grammatical rule of a natural language into a listing of a first sequence of nucleotides, wherein the grammatical rule comprises an ordered set of slots, and wherein each slot of the ordered set of slots may be filled with a compatible token, and wherein a token is a string of characters comprised by a vocabulary of the natural language;

the processor further translating a first token of the vocabulary into a listing of a second sequence of nucleotides;

the processor decoding information represented by a bonded pair of nucleotide sequences, wherein the bonded pair was formed by a chemical bonding of a first nucleotide chain to a second nucleotide chain, wherein nucleotides of the first nucleotide chain are ordered in the first sequence, wherein nucleotides of the second nucleotide chain are ordered in the second sequence, and wherein the decoded information represents a data structure formed by filling a first slot of the ordered set of slots with the first token.

A third embodiment of the present invention provides a computer system comprising a processor, a memory coupled to said processor, and a computer-readable hardware storage device coupled to said processor, said storage device containing program code configured to be run by said processor via the memory to implement a method for natural-language processing based on DNA computing, the method comprising:

the processor translating a grammatical rule of a natural language into a listing of a first sequence of nucleotides, wherein the grammatical rule comprises an ordered set of slots, and wherein each slot of the ordered set of slots may be filled with a compatible token, and wherein a token is a string of characters comprised by a vocabulary of the natural language;

the processor further translating a first token of the vocabulary into a listing of a second sequence of nucleotides;

the processor decoding information represented by a bonded pair of nucleotide sequences, wherein the bonded pair was formed by a chemical bonding of a first nucleotide chain to a second nucleotide chain, wherein nucleotides of the first nucleotide chain are ordered in the first sequence, wherein nucleotides of the second nucleotide chain are ordered in the second sequence, and wherein the decoded information represents a data structure formed by filling a first slot of the ordered set of slots with the first token.

DETAILED DESCRIPTION

Embodiments of the present invention comprise a method and systems for implementing natural-language processing (NLP) based in part on DNA-computing technology. These methods and systems comprise steps of encoding one or more instances of a natural-language slot grammar and a natural-language vocabulary into a format that may be encoded respectively into two sets of chains of nucleotide chains. Using methods of DNA computing, these two sets of strands are then chemically bonded into double-helix DNA molecules. The molecules encode information that, when decoded by known methods of DNA computing, reveal structured data that would be generated by a parsing function of a natural-language processing system.

Natural Language Processing (NLP) is a field of computer science that deals with human-computer interaction by inferring meaning from a user's natural-language or freeform input. NLP computing problems may be handled by complex, resource-intensive algorithms that comprise techniques of machine-learning. The present invention instead translates these problems into a form that may be processed by means of DNA-computing technology.

This translating may encode a natural-language grammar and vocabulary (sometimes referred to as a "dictionary") into a form that may be represented as a sequence of nucleotides, then uses a method of DNA computing to more efficiently solve a massively parallel NLP problem represented by these nucleotide chains into which this information has been encoded.

In embodiments described here, the nucleotide chains into which a natural-language grammar are encoded may be generically described as "base" nucleotide strings, and the nucleotide chains into which a natural-language vocabulary are encoded may be generically described as "filler" nucleotide strings.

A DNA molecule is a molecule of deoxyribonucleic acid, a lengthy linear polymer found in nature within a nucleus of a cell. A DNA molecule comprises two chains of molecules, known as nucleotides, twisted around each other into a shape of a double helix. These chains each comprise a sequence of four types of nucleotides and the order of nucleotides in such a sequence may be used to encode information, much like the way that an order of a sequence of 1's and 0's in a byte of computer memory may encode information.

DNA computing is a form of computing that, rather than using traditional silicon-based computer technologies, encodes and stores data in such a sequence of nucleotides and processes that data by allowing chemical reactions to occur between such encoded sequences. An encoding process may be performed such that these chemical reactions arrange or rearrange nucleotides in the reacting chains. The resulting data manipulation represented by the arrangement or rearrangement may be analogous to functions performed by electronic components, such as flip-flops or a digital-logic gate. By decoding information represented by the resulting arranged or rearranged sequences, or represented by a manner in which chains have bonded as a result of the chemical reaction, it is possible to identify a result of a computation, wherein the input to the computation was represented by the initial nucleotide sequences and the performance of the computation is represented by the chemical reaction.

A DNA "computer" can, for example, perform logical AND, OR, or NOT operations upon a pair of data elements that are each represented by a chain of nucleotides. The performance of such an operation may be performed by allowing the two chains to chemically react in certain ways. Such chemical reactions, known to those skilled in the art of molecular biology, DNA computing, and related fields, may be triggered by mixing together, or otherwise combining, one or more instances of each data-representing chain, possibly in the presence of a triggering enzyme.

In some cases, a DNA-computing procedure may comprise a reverse procedure that initiates a chemical reaction on a DNA molecule that divides the molecule into two or more component chains of nucleotides. In other cases, a DNA computing procedure may comprise performing a chemical reaction on two chains of nucleotides that causes some or all of the chains to self-assemble into DNA molecules or to be divided into component sub-chains. If input data has been encoded into the DNA molecules or nucleotide chains prior to the reaction, the resulting molecules may be decoded or analyzed to reveal output data that would have been produced by subjecting the input data to a computation that is analogous to the reaction. Specifically, the pattern, position, or organization of bonds between the chains of a resultant DNA molecule may be decoded to yield information, and the arrangement and position of the chains in the resultant DNA molecule may be decoded to yield information.

Each nucleotide in this context may be any one of four types of molecules, each of which is commonly identified by a single-letter abbreviation: adenine (A), cytosine (C), guanine (G), and thymine (T). A sequence of these molecules may be linked in a nucleotide chain that we represent here as a sequential listing of the nucleotides in the chain. As described above, an order of nucleotides in such a sequence may be deemed to represent information, much as an order of 1's and 0's in a byte of binary computer data may be deemed to represent an eight-bit number.

In one example, a first nucleotide sequence ATCG can be deemed to represent a TRUE state of a logical variable and a second nucleotide sequence CGAT can be deemed to represent a FALSE condition of the variable. Because nucleotide chains may comprise very long sequences, this mechanism allows an enormous amount of information to be represented by a single nucleotide sequence.

In this document, we will refer to a process of translating a piece of data into an equivalent sequence of nucleotides as a step of "encoding" the data. Similarly, we will refer to a process of identifying a piece of data that has been encoded into a sequence of nucleotides as a step of "decoding" the data.

Here, encoding and decoding identify a data-processing function that translates an input data element, such as representation of a word, a letter, a grammatical part of speech associated with a word, a syntactical characteristic of a phrase, or an other element of data that might be comprised by a slot grammar, into a sequence of nucleotide identifiers, such as a sequence of alphanumeric values that are each associated with one type of nucleotide molecule. The criteria by which an input data element is associated with a particular nucleotide sequence may be implementation-dependent, based upon expert knowledge of the input data source or of a physical or chemical characteristic of the embodiment, or upon other techniques, knowledge, or tools known to one skilled in the art of information-processing, DNA computing, molecular biology, natural-language processing, or a related art.

If a DNA molecule comprises two nucleotide chains entwined in a double-helix shape, those two chains may be held together by hydrogen bonds that each link a nucleotide of a first chain to a nucleotide of a second chain.

In a typical DNA-computing operation, a set of DNA molecules (or "strands" of DNA) or a set of nucleotide chains are encoded with input data. This encoding may comprise using methods, technologies, or techniques known in the art to generate strands of DNA or chains of nucleotides in which nucleotides are ordered into specific sequences that represent the input data. In some cases, many copies of each molecular sequence may be created in this manner.

These molecules are then combined by methods known to those skilled in the art. They may, for example, be simply mixed together in a vessel. Such mixing may be facilitated by the addition of enzymes, co-enzymes, or other chemical components that enable a desired chemical reaction. This mixing process may happen quickly, often in a matter of seconds, and requires small amounts of energy in comparison to the amount of energy required by a conventional electronic computer. Because this mixing procedure may simultaneously combine large numbers of molecules, it may be used to quickly perform massively parallel operations.

If the combination is successful, some of the input molecules may stick together, break apart, or recombine to form new sequences of nucleotides. The order of nucleotides in these new sequences may be decoded by inverting the previous encoding procedure in order to reveal output data. This output data is analogous to output data that would be produced by applying a computational operation upon the input data, wherein the computational operation is analogous to the operation of the chemical reaction comprised by the mixing.

Embodiments of the present invention comprise steps that employ known methods, similar to those described above, to perform computational procedures by means of biochemical interactions among DNA molecules.

Embodiments of the present invention may, for example, use this technology to create an efficient, compact, and fast mechanism for integrating a vocabulary or dictionary into an NLP system's grammar. Such embodiments may be used to perform tasks like identifying all possible sentences that may be formed by arranging words of the vocabulary according to grammatical rules of the NLP system, or by parsing words of a user's real-time natural-language input into all sentences that comply with the NLP system's grammatical rules.

Such methods are explained in greater detail in the descriptions of the figures below.

Figure 1:
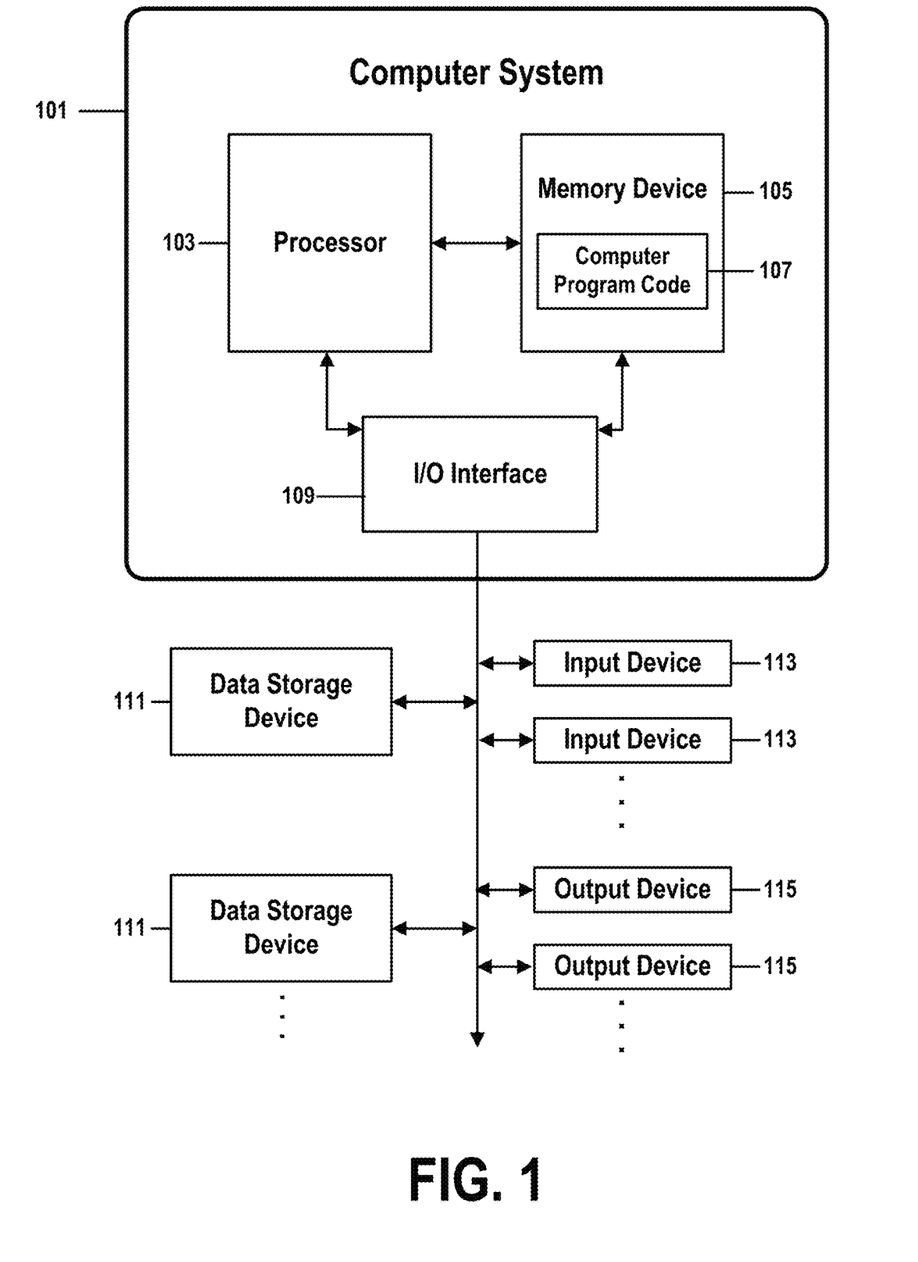
FIG. 1 shows the structure of a computer system and computer program code that may be used to implement a method for natural-language processing based on DNA computing in accordance with embodiments of the present invention.

FIG. 1 shows a structure of a computer system and computer program code that may be used to implement a method for natural-language processing based on DNA computing in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for natural-language processing based on DNA computing in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for natural-language processing based on DNA computing.

Any of the components of the present invention could be created, integrated, hosted, maintained, deployed, managed, serviced, supported, etc. by a service provider who offers to facilitate a method for natural-language processing based on DNA computing. Thus the present invention discloses a process for deploying or integrating computing infrastructure, comprising integrating computer-readable code into the computer system 101, wherein the code in combination with the computer system 101 is capable of performing a method for natural-language processing based on DNA computing.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for natural-language processing based on DNA computing may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for natural-language processing based on DNA computing is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
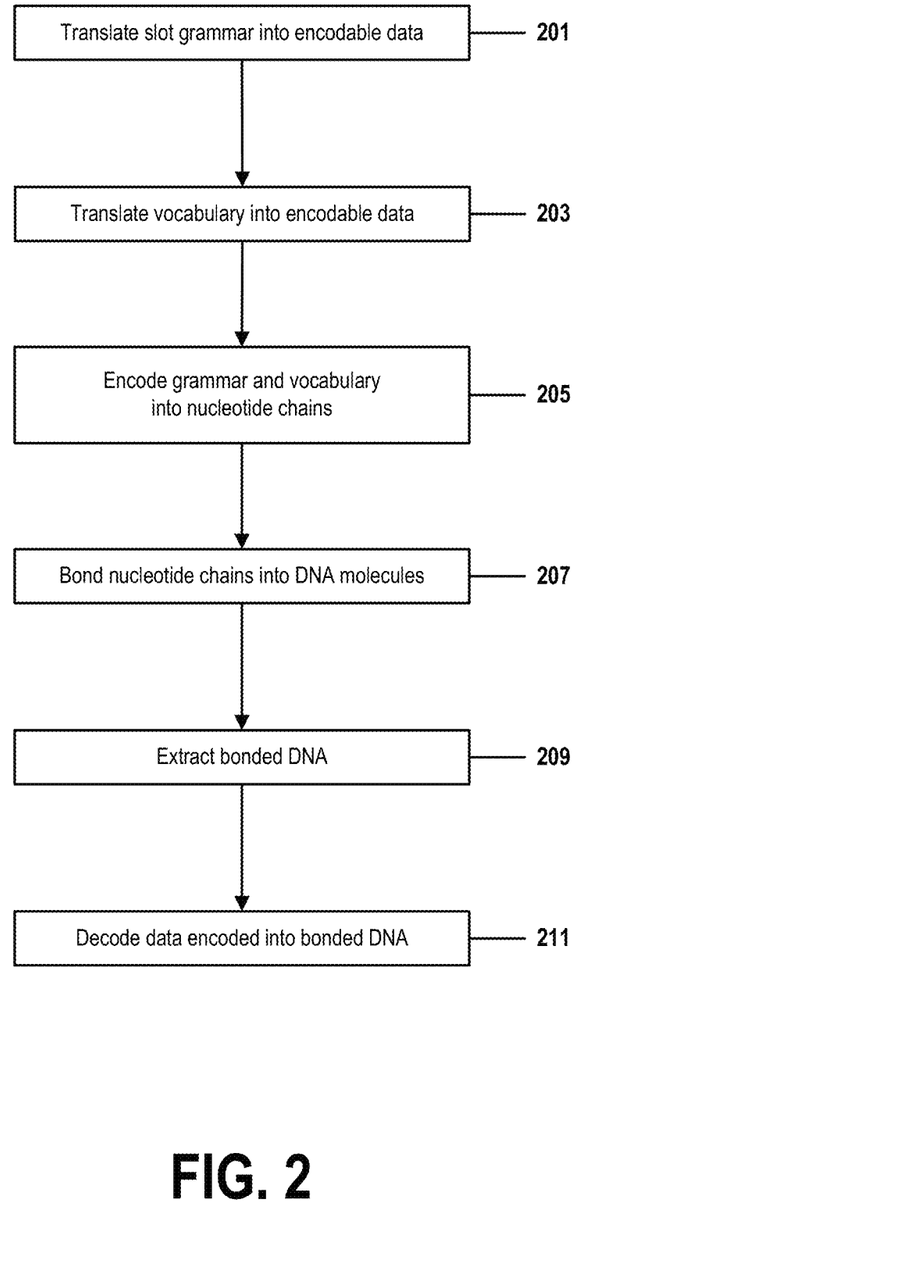
FIG. 2 is a flow chart that illustrates the steps of a method for natural-language processing based on DNA computing in accordance with embodiments of the present invention.

FIG. 2 is a flow chart that illustrates steps of a method for natural-language processing based on DNA computing in accordance with embodiments of the present invention. FIG. 2 comprises steps 201-211.

In embodiments shown herein, the natural-language processing (NLP) system infers meaning from a vocabulary or dictionary of words by organizing those words as a function of a set of grammatical rules. FIG. 2 describes a "slot-and-filler" mechanism for performing this task, in which a "slot grammar" implicitly identifies grammatical rules by identifying a correct grammatical structure that comprises one or more "slots" into which "filler" words may be inserted. These words may be entered by a user as natural-language input, they may be organized into a dictionary or vocabulary, or they may be identified by other means.

In one example, if a simple slot grammar of an NLP system identifies a two-slot sentence that comprises a "subject" slot followed immediately by a "predicate" slot, and a user enters vocabulary words "John agrees," the NLP system can fill the two slots with the corresponding input words, resulting in an identification of the user input "John" as a subject of a sentence and an identification of the user input "agrees" as a predicate of the sentence. This filling may be performed by means of other guidelines, rules, data structures, or internal logical elements of the NLP system.

In step 201, a slot grammar of a natural-language processing (NLP) system is translated into a set of sequential patterns that may each be encoded into a nucleotide chain.

The slot grammar may take any form known to those skilled in the art of artificial intelligence, natural-language processing, knowledgebase management, or related fields. A slot grammar, within the context of NLP theory, comprises a set of structures that represent grammatical rules of a natural language. Each structure identifies characteristics of a sentence, phrase, character, or other component of a natural-language statement.

A slot-grammar structure comprises one or more "slots," each of which may be filled with a letter, word, character, phrase, sentence, or other token. Each slot is associated with a characteristic of an entity that may be inserted into the slot. Such a characteristic can comprise a part of speech (such as a noun, a verb, or a pronoun), a syntactical classification (such as a subject, a dependent clause, or a predicate), a semantic classification (such as a category or hierarchy of meaning or concept, or a relationship to another category of meaning or concept), or an other grammatical classification.

When such a structure is filled with elements of a natural-language statement, the organization of those elements in the slot-grammar structure allows meaning to be inferred from or otherwise associated with those elements.

In one example, a slot grammar structure may comprise a sequence of four slots:

| SUBJECT | PREDICATE | OBJECT | PREPOSITIONAL PHRASE |
|---------|-----------|--------|----------------------|

An English natural-language sentence "The mailman will deliver a package on Monday." can be parsed by an NLP front-end, using methods known in the art, into this structure as:

| SUBJECT | PREDICATE | OBJECT | PREPOSITIONAL PHRASE |
|---------|-----------|--------|----------------------|
| the mailman | will deliver | a package | on Monday |

Such a filling of the slot-grammar structure would then allow the natural-language processor to infer characteristics of each token of the natural-language sentence. Such an inference can identify that the speaker of the sentence intended to state that an action of delivery would be performed by the mailman, not by the package or by any other noun in the sentence, such as "Monday." Such an analysis would allow the processor to more accurately infer a meaning to the sentence.

A slot grammar may, in this way, present alternative structures, each of which can associate a particular sentence with a different meaning or to infer different sets of relationship among the elements of the sentence. A structure:

| SUBJECT | PREDICATE | OBJECT | ADVERB |
|---------|-----------|--------|--------| can, for example, incorrectly infer that the phrase "on Monday" is an adverb. This second structure, however, can correctly parse a different sentence (such as "The mailman will deliver a package safely.") that would have been incorrectly parsed by the first structure.

A slot grammar will thus generally comprise many, often seemingly redundant, slot structures that may be filled with input data. A properly designed natural-language processing system will try to guess which structure is most likely to interpret the input correctly by applying other rules, inferences, or contextual information by means known to those skilled in the art.

In step 201, these types of data structures are encoded into nucleotide strings as described above, wherein a certain type of data element is deemed to be represented by a corresponding sequence of nucleotides.

In one example, a slot-grammar structure:

| SUBJECT | PREDICATE | OBJECT |
|---------|-----------|--------| can be encoded as a nucleotide sequence: CTC-TGA-GTCGA (SEQ. ID NO 1). Here, the nucleotide sequence CTC would be deemed to identify a "subject" slot, the nucleotide sequence TGA would be deemed to identify a "predicate" slot, and the nucleotide sequence GTCGA would be deemed to identify an "object" slot.

In some embodiments, this sequence can be encoded as a single chain of nucleotides. In other embodiments, this sequence can be encoded as part of a DNA molecule.

All relevant slot structures comprised by the slot grammar are in step 201 are thus translated in this manner into nucleotide sequences that may be encoded into nucleotide chains or DNA molecules in step 205.

The details of the translation, such as conventions that associate a component of the slot grammar with a particular nucleotide sequence, are implementation-dependent and may be chosen as a function of any criteria relevant to the natural-language processing computer software, to the nature of the natural-language tasks to be performed by the natural-language processor, or to other criteria specific to a particular implementation.

In some embodiments, for example, the SUBJECT-PREDICATE-OBJECT slot-grammar structure shown immediately above can be translated into a different nucleotide sequence CTCT-TGA-GTCGA (SEQ. ID NO 2), based on an arbitrary association of a "subject" slot with a nucleotide sequence "CTCT."

In step 203, a similar process is used to translate a "filler" vocabulary or dictionary of words into sequences that may be encoded into "filler" sequences of nucleotides.

As explained above, this filler vocabulary or dictionary may comprise information submitted to the NLP system by a user or retrieved or inferred by the NLP system from an other source. Filler strings may, for example, comprise a combination of one or more sets of individual words, one or more sets of phrases, one or more sets of characters, a string of an other type of input tokens, or an isolated natural-language sentence or phrase entered by a user, retrieved from a storage medium, or inferred from an other source.

As with the slot grammar in step 201, the filler vocabulary may be translated by means of rules or guidelines specific to a particular embodiment. In some embodiments, a specific pattern of translated data may correspond to a particular letter, word, phrase, character, part of speech, or meaning.

In one example, if a letter "h" in a word of a filler vocabulary corresponds to a cytosine-thymine (CT) nucleotide sequence and a letter "e" in a word of a filler vocabulary corresponds to a thymine-guanine (TG) nucleotide sequence, then the one or more processors can in step 203 translate the word "he" to a CTTG nucleotide sequence, or to a nucleotide sequence that is derived as a function of a CTTG sequence.

In another example, each word of the filler vocabulary may be associated with a unique nucleotide sequence, wherein each such unique sequence may be chosen as a function of a chemical property of a corresponding nucleotide chain, and such that a desired output is produced when the corresponding nucleotide chain is allowed to chemically react with the nucleotide chains or DNA molecules created by encoding the slot-grammar information derived in step 201.

In yet another example, a word or phrase of the filler vocabulary may be translated into an encodable sequence that is selected as a function of a meaning of the word or phrase. In some embodiments, synonyms, hypernyms, and hyponyms may be associated with nucleotide sequences that share common sub-sequences, and that may thus share a subset of the chemical properties that determine how the corresponding nucleotide chains will reaction with slot grammar-encoded chains.

For example, the word "fruit" may be deemed a hypernyms of hyponyms "apple," "orange," and "plum" because the semantic meaning of the three hyponyms is comprised by the meaning of the hypernyms "fruit." In some embodiments, this semantic relationship may be represented as a set of nucleotide patterns that bear a similar relationship.

In such a case, the hypernymonic aspect of a meaning of the word "fruit" may be associated with, or represented by, a GCT nucleotide sequence. Because the words "apple," "orange," and "plum" share this aspect of meaning, they too can be translated into data that may be encoded into the same GCT sequence, or that may be encoded into a sequence that is a function of the GCT sequence. In some cases, a hyponym may be translated into data that is a function of a sequence associated with its hypernym in order to better identify the hypernym-hyponym relationship. In the current example, the hyponyms can be translated into encoded data that comprises an AGCT subsequence that identifies each hyponym as being related to a hypernym associated with a GCT sequence.

Many possible encodings and relationships are possible, and may be functions of implementation-dependent details or of a goal of a designer of the embodiment. In one embodiment, the "fruit" example described above can in step 203 result in the four words being translated into data that corresponds to the following nucleotide sequences, wherein a "GCT" sequence is associated with a "fruit" meaning or context, and wherein an "AGCT" sequence is associated with a species of or a narrowing of the "fruit" meaning or context. Such a translation or encoding method can help ensure that semantic properties of these filler-vocabulary words are mirrored in chemical properties associated with the nucleotide chains that result when the translated data is encoded in step 205. This translating can then associate the filler vocabulary with the following nucleotide sequences:

fruit==>GCT
apple==>AGCT
orange==>TAGCT
plum==>GTAGCT

As shown here, in some embodiments, a length of a nucleotide sequence (that is, a number of nucleotides comprised by the sequence) associated with a letter, word, character, phrase, sentence, or other token of a filler vocabulary may have a variable length. Such a variable length may be a function of one or more factors that may comprise, but are not limited to, a meaning or context of the token, a number of letters, words, or other elements comprised by the token, a relationship or a number of relationships of the token to other components of the filler vocabulary, or a length of a slot in a component of a corresponding slot grammar, wherein that slot may have a relationship to the token.

In some embodiments, a letter, word, character, phrase, sentence, or other token of a filler vocabulary may be associated with a fixed length of a nucleotide sequence, such that all nucleotides that satisfy a certain condition have a same length. Some embodiments may have an ability to derive both variable-length and fixed-length nucleotide sequences. In some cases, a length of a length of such a sequence may not be constant, or may be a function of a meaning or context associated with the sequence.

If, for example an input vocabulary word "orange" could, depending on context, could refer to either a type of fruit or to a color, that word can be associated with one or both of two distinct sequence of nucleotides. If the input word is initially associated with a first of the two distinct sequences, perhaps corresponding to an inferred meaning of the word as identifying a type of fruit, subsequent processing or analysis can later instead reassociate the word with a second of the two sequences, corresponding to an inferred meaning as a color. If those two nucleotide sequences have different lengths, this reassociation can result in a change in the length of the representation of the word "orange."

In some embodiments, an input vocabulary string may comprise two or more repeated tokens or substrings that, depending on how the tokens or substrings are delimited, may be interpreted in more than one way or that may correspond to different grammatical rules of the slot grammar.

In one example, if a user enters a vocabulary string "the event will be very, very important," the embodiment may detect that the latter portion of this string contains a substring or sequence of duplicate words, and that interpreting and encoding this substring may depend upon how the duplicate words are delimited or otherwise interpreted. The last portion of the vocabulary string might thus be delimited in step 203 as either: "very important" or "very, very important." In such a case, the embodiment might encode each of these two candidate interpretations into a distinct nucleotide sequence. The one or more processors would then independently process each of these encoded sequences in the remaining steps of the method of FIG. 2. In some cases, the one or more processors may encode a substring that comprises duplicate words, where the user may intend the duplication to amplify a meaning of a word, in such a way that an amplification or intensification of meaning may be inferred from the encoded form.

At the conclusion of step 203, the one or more processors will have generated two sets of data capable of being encoded respectively into two sets of nucleotide chains. In step 201, the processor will have translated each rule or structure comprised by a slot grammar into information that may be encoded into a "slot-grammar" nucleotide sequence, wherein the slot-grammar sequence is chosen so as to have chemical properties analogous to, or related by some other function to, a syntactic or semantic meaning, inference, or context associated with the rule or structure.

Similarly, in step 203, the one or more processors will have translated each letter, word, character, phrase, sentence, or other token of an input string, vocabulary, dictionary, or other set of linguistic objects into information that may be encoded into a "filler-string" nucleotide sequence, wherein the filler-string sequence is chosen so as to have chemical properties analogous to, or related by some other function to, a syntactic or semantic meaning, inference, or context associated with the token.

In step 205, the data derived in step 201 is, as described above, encoded into a set of slot-grammar nucleotide chains and the data derived in step 203 is, as described above, further encoded into a set of filler-string nucleotide chains. This encoding may be performed by means known to those skilled in the art of DNA synthesis, molecular biology, DNA computing, or related fields. Such means may comprise, but is not limited, to creation of specific cDNA (complementary DNA) strands in a laboratory.

In some embodiments, some or all of the data derived in steps 201 and 203 may be encoded in step 205 into strands of DNA or other types of genetic material capable of representing stored information. Such embodiments, may comprise a variation of the procedure of step 207, as described below.

In step 207, the slot-grammar nucleotide chains and the filler-string nucleotide chains are allowed to chemically react.

In some embodiments, this chemical reaction may comprise a chemical bonding of a chain of filler nucleotides to a chain of slot-grammar nucleotides. Such bonding may be managed or performed by means known to those skilled in the art of DNA synthesis, molecular biology, DNA computing, or related fields. Such means of performing may comprise, but is not limited to, simply mixing the two sets of nucleotide chains in an appropriate liquid medium; or mixing the two sets in a medium in the presence of a chemical catalyst.

This bonding may be a function of chemical or physical characteristics of the nucleotides in the bonding chains. Certain pairs of nucleotides, for example, more readily bond into stable, complementary pairs under certain conditions. Nucleotides adenine (A) and thymine (T) are such a pair, as are guanine (G) and cytosine (C).

The method of steps 201 and 203, which translated logical NLP data into a form that may be encoded in nucleotide chains, accounts for these chemical properties. As described above, this translation is configured so as to allow the encoding method of step 205 to produce sequences of nucleotides that are analogous to a result that would be computed by a traditional silicon-based NLP-processing computer program, by allowing sequences of nucleotides encoded in step 205 to will bond in ways that are analogous to ways in which the traditional NLP program would have processed the original NLP data structures.

The examples described above in the discussion of steps 201 and 203 illustrate simple implementations of this translation step. In a real-world implementation, a complex slot grammar may require a large number of slot data structures in order to adequately describe grammatical rules and relationships among tokens of a natural language like English, German, or Japanese.

Similarly, in a real-world implementation, a dictionary or vocabulary of a natural language may comprise hundreds of thousands of letters, words, characters, phrases, sentences, or other tokens. In embodiments that process a vocabulary that can be entered in real-time by a user, the entered tokens will have been translated in step 203 into patterns of nucleotide sequences that conform to similar rules and that result in nucleotide chains that produce similar results when allowed to react with slot-grammar nucleotide chains.

In some embodiments, the bonding process of step 205 can further comprise bonding a "marker" or "DNA marker" molecule to a slot-grammar nucleotide chain by means known to those skilled in the art of molecular biology. Such a marker may, for example, be a hydrocarbon molecule that comprises a carbon chain that may bond with an oxygen atom of a phosphate group. Such marker molecules may, because of this property, have a property of bonding under certain conditions to unfilled positions of a slot-grammar nucleotide chain.

This bonding property may, in some embodiments, allow such marker molecules to perform functions analogous to those of delimiter strings or values in a data structure of a traditional computer application. In one example, a slot-grammar nucleotide chain may comprise a sequence of twelve nucleotides that form a slot for a "subject" vocabulary filler-string nucleotide chain. If a filler-string nucleotide chain encodes a seven-nucleotide representation of token that is a candidate "subject," a bonding of the seven-position filler-string chain to the twelve-position slot would leave five unbonded nucleotides. In order to prevent unwanted bondings that can fill those five open positions with "noise" nucleotides, embodiments that comprise use of DNA markers can protect those five open positions from unwanted bonding by causing them to be bonded to markers.

In similar embodiments, DNA markers may be introduced in step 207 in order to allow those markers to delimit filler-string nucleotides bonded to a part of a slot-grammar nucleotide. If, for example, encoded filler strings may comprise different numbers of nucleotides, a delimiter may be used to identify a length of a filler string that has filled a slot in a slot-grammar chain. In other cases, a marker may be used to separate two filler strings that have filled adjacent slots of a slot-grammar nucleotide chain.

In one example, a slot-grammar nucleotide chain may comprise a six-nucleotide "SUBJECT" slot and a four-nucleotide "OBJECT" slot:

| SUBJECT | | | | | | OBJECT | | | |
|---|---|---|---|---|---|---|---|---|---|
| | | | | | | | | | |

In one instance, this slot-grammar chain may bond with a five-nucleotide "SUBJECT" filler string ACCGT and a five-nucleotide "OBJECT" filler string TGCA:

| SUBJECT | | | | | OBJECT | | | |
|---|---|---|---|---|---|---|---|---|
| A | C | C | G | T | T | G | C | A |

In a second instance, this slot-grammar chain may bond with a four-nucleotide "SUBJECT" filler string ACTT and a five-nucleotide "OBJECT" filler string TGCA:

| SUBJECT | | | | OBJECT | | | |
|---|---|---|---|---|---|---|---|
| A | C | T | T | T | G | C | A |

Even if, as here, the subject slot is a fixed length, it is not clear how many of the six "SUBJECT" positions have bonded to actual information-carrying encoded nucleotides. This is especially true if the unfilled positions inadvertently bond to random nucleotides. This problem may be resolved by filling the unfilled positions with "M" marker molecules to yield bonded slot-filler combinations similar to:

| SUBJECT | | | | | | OBJECT | | | |
|---|---|---|---|---|---|---|---|---|---|
| A | C | C | G | T | M | T | G | C | A |

| SUBJECT | | | | | | OBJECT | | | |
|---|---|---|---|---|---|---|---|---|---|
| A | C | T | T | M | | T | G | C | A |

| SUBJECT | | | | | | OBJECT | | | |
|---|---|---|---|---|---|---|---|---|---|
| A | C | T | T | M | M | T | G | C | A |

In each of these cases, the "SUBJECT" filler string is clearly delimited by one or more marker molecules.

In some embodiments a restriction enzyme may be used to limit nucleotides of a filler string to only certain slots or to only certain nucleotides of a nucleotide sequence that may be comprised by a slot. Although it is known to the art to use a restriction enzymes to perform operations such as cutting a nucleotide string into two substrings, use of a restriction enzyme in this manner, to prevent certain nucleotides from being available for bonding, is a novel feature of the present invention.

As mentioned in the description of step 205, some embodiments may comprise a variation of the procedure of steps 201-205, in which information is translated and encoded into genetic material other than single strands of nucleotides, such as into complete double-helix DNA molecules. In such embodiments, the procedure of step 207 would comprise a chemical reaction or other method known to those skilled in the art of molecular biology that produces an outcome from the encoded genetic material from which data may be inferred, similar to the way in which data may be inferred, in the previously described method of step 207, from DNA strands that result from the bonding of nucleotide chains. This chemical reaction or other method can, for example, comprise splitting encoded DNA molecules into single chains of nucleotides or recombining single chains split in this way into new DNA molecules.

In step 209, the genetic material into which is encoded the processed, output data generated in step 207 is extracted or otherwise segregated from other genetic material by means known to those skilled in the art of molecular biology. This other genetic material can comprise, but is not limited to, slot-grammar nucleotide chains or filler-string nucleotide chains that have not bonded to other chains. In embodiments in which a slot-grammar and a filler vocabulary have each been encoded into a set of single-strand nucleotide chains, step 209 can comprise extracting each double-helix DNA strand formed by a bonding of one or more filler chains to a slot-grammar chain.

In embodiments in which many copies of each encoded chain are combined in step 207, redundant copies of resulting genetic material created in step 207 may be filtered out in step 209. This filtering out of redundant copies may be performed by means known to those skilled in the art of molecular biology or related fields. In some embodiments, this filtering out of redundant copies may not occur until the extracted or otherwise segregated genetic material has been translated into a digital representation. In such a case, the filtering out would be performed as a data-processing task performed by the one or more processors.

At the conclusion of step 209, the genetic material information generated in step 207 will have been identified. This identification of the generated genetic material may be in a form that may be understood by the one or more processors, but it may not, however, directly represent the data encoded into the generated genetic material. In some embodiments, this form may comprise a listing of nucleotide sequences or DNA genomes associated with the genetic material generated in step 207.

In step 211, the one or more processors analyze or otherwise process a digital representation of the genetic material extracted or otherwise segregated in step 209. This analyzing or otherwise processing may comprise a decoding procedure that is complementary to the encoding or translation procedures of steps 201-205. As with those encoding or translation procedures, this decoding procedure will identify information represented by the sequences and bonding patterns of nucleotides comprised by the genetic material extracted or otherwise segregated in step 209.

In particular, this decoded information will be analogous to a set of data structures that would have been generated by the one or more processors when performing a traditional procedure of matching the filler vocabulary of step 203 to the slot grammar of step 201.

In one example, if a slot-grammar structure comprises a six-character "SUBJECT" slot, a traditional computing procedure can fill that slot with a filler string "apple" after inferring from a context of a word "apple" in an input data stream that the word "apple" is likely to be a subject of a user's natural-language sentence.

In such an example, a method of the present invention can identify a similar relationship in step 211 by decoding a DNA molecule in which a first sequence of nucleotides, which encode or otherwise represent a character string or a concept of "apple," is bound to a second sequence of nucleotides that encode or otherwise represent the "SUBJECT" slot of a slot-grammar data structure.

of the ordered set of slots is configured to be filled with a compatible token, and wherein a token is a string of characters comprised by a vocabulary of the natural language;

the processor further translating a first token of the vocabulary into a listing of a second sequence of nucleotides;

the processor decoding information represented by a first bonded pair of nucleotide sequences, wherein the first bonded pair was formed by a chemical bonding of a first nucleotide chain to a second nucleotide chain, wherein nucleotides of the first nucleotide chain are ordered in the first sequence, wherein nucleotides of the second nucleotide chain are ordered in the second sequence, and wherein the decoded information represents a data structure formed by filling a first slot of the ordered set of slots with the first token;

the processor determining that the first token comprises an adjacent pair of duplicate substrings;

the processor identifying a second token that, other than omitting one occurrence of the duplicate substrings, is identical to the first token;

the processor translating the second token into a listing of a third sequence of nucleotides; and the processor decoding information represented by a second bonded pair of nucleotide sequences, wherein the second bonded pair was formed by a chemical bonding of a third nucleotide chain to a fourth nucleotide chain, wherein nucleotides of the third nucleotide chain are ordered in the third sequence, wherein nucleotides of the fourth nucleotide chain are ordered in the first sequence, and wherein the decoded infor-

What is claimed is:

1. A method for natural-language processing based on DNA computing, the method comprising:

a processor of a computer system translating a grammatical rule of a natural language into a listing of a first sequence of nucleotides, wherein the grammatical rule comprises an ordered set of slots, and wherein each slot mation represents a data structure formed by filling a first slot of the ordered set of slots with the second token.

2. The method of claim 1, wherein an unfilled slot of the ordered set of slots is compatible with the first token if a first grammatical classification associated with the unfilled slot matches a second grammatical classification associated with the first token.

3. The method of claim 2, wherein the first grammatical classification and the second grammatical classification each identifies a characteristic selected from a group comprising: a part of speech, a sentence, a clause, a syntactical classification, a semantic classification, and combinations thereof.

4. The method of claim 1, wherein the vocabulary comprises natural-language text entered by a user.

5. The method of claim 1, wherein the vocabulary comprises a dictionary of words comprised by the natural language.

6. The method of claim 1, wherein the first bonded pair of nucleotide sequences is further formed by a chemical reaction that occurs when multiple copies of the first sequence of nucleotides and multiple copies of the second sequence of nucleotides are combined in a medium, and wherein duplicate copies of the first bonded pair are discarded prior to the decoding.

7. The method of claim 1, wherein the first slot comprises a greater number of nucleotides than does the first token, and wherein the chemical bonding further comprises bonding a marker molecule to each nucleotide of the first slot that is not bonded to a nucleotide of the first token.

8. The method of claim 7, wherein the marker molecule is a hydrocarbon that comprises an open bond that may bond with an oxygen atom of a phosphate group.

9. The method of claim 1, further comprising providing at least one support service for at least one of creating, integrating, hosting, maintaining, and deploying computer-readable program code in the computer system, wherein the computer-readable program code in combination with the computer system is configured to implement the translating a grammatical rule, the further translating a first token of the vocabulary, the decoding information represented by a first bonded pair, the determining, the identifying, the translating the second token, and the decoding information represented by a second bonded pair.

10. A computer program product, comprising a computer-readable hardware storage device having a computer-readable program code stored therein, said program code configured to be executed by a processor of a computer system to implement a method for natural-language processing based on DNA computing, the method comprising:
  the processor translating a grammatical rule of a natural language into a listing of a first sequence of nucleotides, wherein the grammatical rule comprises an ordered set of slots, and wherein each slot of the ordered set of slots is configured to be filled with a compatible token, and wherein a token is a string of characters comprised by a vocabulary of the natural language;
  the processor further translating a first token of the vocabulary into a listing of a second sequence of nucleotides;
  the processor decoding information represented by a first bonded pair of nucleotide sequences, wherein the first bonded pair was formed by a chemical bonding of a first nucleotide chain to a second nucleotide chain, wherein nucleotides of the first nucleotide chain are ordered in the first sequence, wherein nucleotides of the second nucleotide chain are ordered in the second sequence, and wherein the decoded information represents a data structure formed by filling a first slot of the ordered set of slots with the first token;
  the processor determining that the first token comprises an adjacent pair of duplicate substrings;
  the processor identifying a second token that, other than omitting one occurrence of the duplicate substrings, is identical to the first token;
  the processor translating the second token into a listing of a third sequence of nucleotides; and
  the processor decoding information represented by a second bonded pair of nucleotide sequences, wherein the second bonded pair was formed by a chemical bonding of a third nucleotide chain to a fourth nucleotide chain, wherein nucleotides of the third nucleotide chain are ordered in the third sequence, wherein nucleotides of the fourth nucleotide chain are ordered in the first sequence, and wherein the decoded information represents a data structure formed by filling a first slot of the ordered set of slots with the second token.

11. The computer program product of claim 10, wherein an unfilled slot of the ordered set of slots is compatible with the first token if a first grammatical classification associated with the unfilled slot matches a second grammatical classification associated with the first token, and wherein the first grammatical classification and the second grammatical classification each identifies a characteristic selected from a group comprising: a part of speech, a sentence, a clause, a syntactical classification, a semantic classification, and combinations thereof.

12. The computer program product of claim 10, wherein the vocabulary comprises natural-language text entered by a user.

13. The computer program product of claim 10, wherein the vocabulary comprises a dictionary of words comprised by the natural language.

14. The computer program product of claim 10, wherein the first slot comprises a greater number of nucleotides than does the first token, and wherein the chemical bonding further comprises bonding a marker molecule to each nucleotide of the first slot that is not bonded to a nucleotide of the first token.

15. A computer system comprising a processor, a memory coupled to said processor, and a computer-readable hardware storage device coupled to said processor, said storage device containing program code configured to be run by said processor via the memory to implement a method for natural-language processing based on DNA computing, the method comprising:
  the processor translating a grammatical rule of a natural language into a listing of a first sequence of nucleotides, wherein the grammatical rule comprises an ordered set of slots, and wherein each slot of the ordered set of slots is configured to be filled with a compatible token, and wherein a token is a string of characters comprised by a vocabulary of the natural language;
  the processor further translating a first token of the vocabulary into a listing of a second sequence of nucleotides;
  the processor decoding information represented by a first bonded pair of nucleotide sequences, wherein the first bonded pair was formed by a chemical bonding of a first nucleotide chain to a second nucleotide chain, wherein nucleotides of the first nucleotide chain are ordered in the first sequence, wherein nucleotides of the second nucleotide chain are ordered in the second sequence, and wherein the decoded information represents a data structure formed by filling a first slot of the ordered set of slots with the first token;

the processor determining that the first token comprises an adjacent pair of duplicate substrings;

the processor identifying a second token that, other than omitting one occurrence of the duplicate substrings, is identical to the first token;

the processor translating the second token into a listing of a third sequence of nucleotides; and the processor decoding information represented by a second bonded pair of nucleotide sequences, wherein the second bonded pair was formed by a chemical bonding of a third nucleotide chain to a fourth nucleotide chain, wherein nucleotides of the third nucleotide chain are ordered in the third sequence, wherein nucleotides of the fourth nucleotide chain are ordered in the first sequence, and wherein the decoded information represents a data structure formed by filling a first slot of the ordered set of slots with the second token.

16. The computer system of claim 15, wherein an unfilled slot of the ordered set of slots is compatible with the first token if a first grammatical classification associated with the unfilled slot matches a second grammatical classification associated with the first token, and wherein the first grammatical classification and the second grammatical classification each identifies a characteristic selected from a group comprising: a part of speech, a sentence, a clause, a syntactical classification, a semantic classification, and combinations thereof.

17. The computer system of claim 15, wherein the first slot comprises a greater number of nucleotides than does the first token, and wherein the chemical bonding further comprises bonding a marker molecule to each nucleotide of the first slot that is not bonded to a nucleotide of the first token.

* * * * *

SEQUENCE LISTING

```
<160> NUMBER OF SEQ ID NOS: 2

<210> SEQ ID NO 1
<211> LENGTH: 11
<212> TYPE: DNA
<213> ORGANISM: Artificial Sequence
<220> FEATURE:
<223> OTHER INFORMATION: Arbitary example of a nucleotide sequence coded
      using SUBJECT-PREDICATE-OBJECT slot-grammar structure

<400> SEQUENCE: 1
ctctgagtcg a                                                           11

<210> SEQ ID NO 2
<211> LENGTH: 12
<212> TYPE: DNA
<213> ORGANISM: Artificial Sequence
<220> FEATURE:
<223> OTHER INFORMATION: Arbitary example of a nucleotide sequence coded
      using SUBJECT-PREDICATE-OBJECT slot-grammar structure

<400> SEQUENCE: 2
ctcttgagtc ga                                                          12
```